United States Patent [19]
Shioya et al.

[11] Patent Number: 5,606,470
[45] Date of Patent: Feb. 25, 1997

[54] METHOD AND APPARATUS FOR CONTROLLING MAGNETORESISTIVE EFFECT ELEMENT HEAD

[75] Inventors: Akio Shioya, Shizuoka-ken; Yuji Hata, Odawara, both of Japan

[73] Assignee: Hitachi, Ltd., Tokyo, Japan

[21] Appl. No.: 397,522

[22] Filed: Mar. 2, 1995

[30] Foreign Application Priority Data

Mar. 18, 1994 [JP] Japan .................................. 6-048350

[51] Int. Cl.$^6$ .............................. G11B 5/03; G11B 5/58; G11B 5/596; G11B 5/127
[52] U.S. Cl. ........................ 360/78.04; 360/113; 360/66; 360/77.01
[58] Field of Search ................................... 360/75, 77.02, 360/77.05, 69, 113, 71, 66, 78.04, 77.01

[56] References Cited

U.S. PATENT DOCUMENTS

| | | | |
|---|---|---|---|
| 5,345,347 | 9/1994 | Hopkins et al. | 360/75 |
| 5,381,279 | 1/1995 | Dunn | 360/75 |
| 5,408,369 | 4/1995 | Miura et al. | 360/75 |
| 5,465,183 | 11/1995 | Hattori | 360/75 |

Primary Examiner—W. C. Kim
Assistant Examiner—Regina Y. Neal
Attorney, Agent, or Firm—Kenyon & Kenyon

[57] ABSTRACT

When a magnetic recording and reproducing apparatus is in a waiting state, feedback control for positioning the carriage is released, and a supply of a sense current to the magnetoresistive effect element of the MR magnetic head is adjusted so as to prolong the life of the MR magnetic head. When the interface and control circuit recognizes that there is no order from the host computer and that the magnetic recording and reproducing apparatus is in a wait state, the servo control circuit releases the feedback control for positioning the head. A mode, etc. selection control circuit controls the recording/reproduction amplifier so as not to supply a sense current to the magnetoresistive effect element of the MR magnetic head. Accordingly, the time for supplying a sense current to the magnetoresistive effect element of the MR magnetic head is reduced in a great measure and, therefore, it is possible to prevent the deterioration of the element characteristics by electro-migration or the like. The result is that the life of the element can be prolonged. Hence, the output of the MR magnetic head can be increased without sacrificing the reliability. Accordingly, it has become possible to improve the performance of a high-output magnetic recording and reproducing apparatus using an MR magnetic head.

8 Claims, 5 Drawing Sheets

METHOD AND APPARATUS FOR CONTROLLING MAGNETORESISTIVE EFFECT ELEMENT HEAD

BACKGROUND OF THE INVENTION

This invention relates to a magnetic recording and reproducing apparatus having mounted thereon magnetic heads (MR magnetic heads) including a magnetoresistive effect element (MR element), and more particularly to a positioning technique in the magnetic recording and reproducing apparatus whereby a magnetic head traces a desired magnetic track (a following action), then starts moving to another desired track (a seek action).

One technique to improve the positioning accuracy of the magnetic heads for the purpose of increasing the magnetic track density, is to use a data track servo (also referred to as "data surface servo") that uses positioning information recorded in advance on the data surfaces of a magnetic recording medium. When one is going to apply the MR magnetic head technique to this data track servo technique, it is necessary to improve the durability of the MR magnetic heads.

This will be described in detail.

If the recording density in the magnetic recording and reproducing apparatus is to be increased, it is unavoidable to reduce the magnetic transition region per unit area on the magnetic medium. This means to decrease the width of each magnetic track (the distance perpendicular to the advancing direction of a magnetic head over the track). Accordingly, the reproduction output of the magnetic head is decreased. A realistic measure to prevent this decrease of reproduction output is to improve the sensitivity of the magnetic head. Under the circumstances, the MR magnetic head including a magnetoresistive effect element (MR element), which is a read-only head for reading the magnetic transition region, has come to be used.

As means for improving the sensitivity of the magnetic heads, if an attempt is made to obtain a large reproduction output by supplying a large sense current to the MR element, the following technical problem arises.

Generally, the sense current density of the MR magnetic head is so high, at somewhere around $10^7$ A/m$^2$, that the life of the MR element tends to be short; for example, electromigration occurs in the material or wiring of the MR element, and a consequent rise of temperature causes the electromigration to be accelerated, resulting in a breakdown of the element.

In order to increase the magnetic track density, it is necessary to improve the positioning accuracy of the magnetic heads. This is the reason why data track servo has come to be used. In the data track servo technique, head positioning information recorded on the data surfaces is used. A combined use of this data track servo technique with MR magnetic heads give rise to the following technical problem.

Generally, it is necessary to make the magnetic head performs a following action to trace a magnetic track. In the data track servo technique, it is necessary to constantly reproduce, with the magnetic head, position information recorded at the leading portions of the sectors obtained by subdividing the tracks in fan-shaped blocks. When data has been reproduced by a magnetic head, the same magnetic head continues a following action while reproducing position information until the next record or, reproduce order is given. In a magnetic recording and reproducing apparatus used with a low frequency of reproduction, it often takes some time before the next record or reproduce order is given, with the result that a cumulative time of use of the MR magnetic heads, including reproduction of position information, is prolonged. This has a direct bearing on the shortening of the life of the MR magnetic heads.

An object of the present invention is to lengthen the life of the MR magnetic heads by minimizing the time of supplying the sense current to the magnetoresistive effect elements of the MR magnetic heads when the magnetic recording and reproducing apparatus is in a state waiting for a data access command from the host computer.

Techniques for prolonging the life of the MR magnetic heads are known. This is a technique, disclosed in Japanese Patent Application No. 5-226850 (filed on Sep. 13, 1993), that controls the head positioning time such that the cumulative time of use of each MR magnetic head, which is a sum of positioning time, data reproduction time, etc. is a fixed length of time. In the present invention of this patent application, however, the above-mentioned problem is to be solved by a different technique.

SUMMARY OF THE INVENTION

The main characteristic of the present invention is that the time of conduction to the MR magnetic heads is decreased in compensation for the prolongation of starting time of seek by the MR magnetic heads when the magnetic recording and reproducing apparatus is in a waiting state. Incidentally, the specifications for the magnetic disk apparatus or the magnetic tape apparatus, for example, to which the present invention is applied, have such items as:

1) if a servo track servo (or servo surface servo) control system is provided, before a seek action is started, initialization (RTZ action: Return to Zero action) is performed by which the magnetic heads are moved to specified positions; and 2) if a data surface servo control system is provided, magnetic track position information is read when a seek action is resumed.

Therefore, it does not matter much even if the prolongation of starting time of seek occurs when the magnetic recording and reproducing apparatus is in a waiting state. It ought to be noted that in the data surface servo technique, an RTZ action may be taken.

To be more specific, a first characteristic of the present invention is that in a magnetic recording and reproducing apparatus having MR magnetic heads, while a data access command is not issued by the host computer, the feedback control (closed loop control) circuit for magnetic head positioning is cut off so as not to conduct a sense current to the magnetoresistive effect elements of the MR magnetic heads.

A second characteristic of the present invention is that in the magnetic recording and reproducing apparatus having MR magnetic heads, while a data access command is not issued from the host computer, the servo information sampling period is prolonged to thereby reduce the time of conduction to the MR magnetic heads. The deterioration of the magnetic head positioning accuracy can be compensated by specifications for the magnetic recording and reproducing apparatus.

A third characteristic of the present invention is that in the magnetic recording and reproducing apparatus having MR magnetic heads performing an idle seek action, while a data access command does not come from the upper equipment, an idle seek action is carried out without a signal output from the MR magnetic head being used and a sense signal is not supplied to the MR elements. In addition, a fixed voltage or electric power is applied at regular intervals to a positioner that positions the MR magnetic heads, such as an actuator or voice coil motor.

Note that what is here referred to as an idle seek action is a seek action that the magnetic recording and reproducing apparatus performs by itself independently for the purpose of preventing dirt from adhering and growing on the slider portions of the magnetic heads when the magnetic heads are positioned continuously at a specific track. The seek action may be performed for other purposes.

Description will now be made of the effects obtained by the arrangement mentioned above.

To give an example, in a magnetic disk apparatus, the time of order execution, such as recording, reproduction or a seek action performed when accessed by the host computer is far longer than the waiting time (standby state) during which the following action continues as there is no access made by the host computer. In the magnetic tape apparatus, on the other hand, when accessed by the upper equipment, the time of tape running during which the following action is taking place until a specified location for recording or reproduction is reached is considerably longer than the time of order execution during which recording or reproduction or a seek action is performed.

In this standby state, if a sense current is conducted continuously to the MR elements to reproduce positioning signals for the following action, tape running, or idle seek, this will greatly affect the life of the magnetoresistive effect elements. Therefore, when the magnetic disk apparatus is in the waiting state that there is no access from the host computer, if the following action, tape running or idle seek is done by the above-mentioned means, by reducing to zero or controlling to minimize the time of supplying a sense current to the magnetoresistive effect elements of the MR magnetic heads, the life of the MR elements can be prolonged.

DETAILED DESCRIPTION

Figure 1:
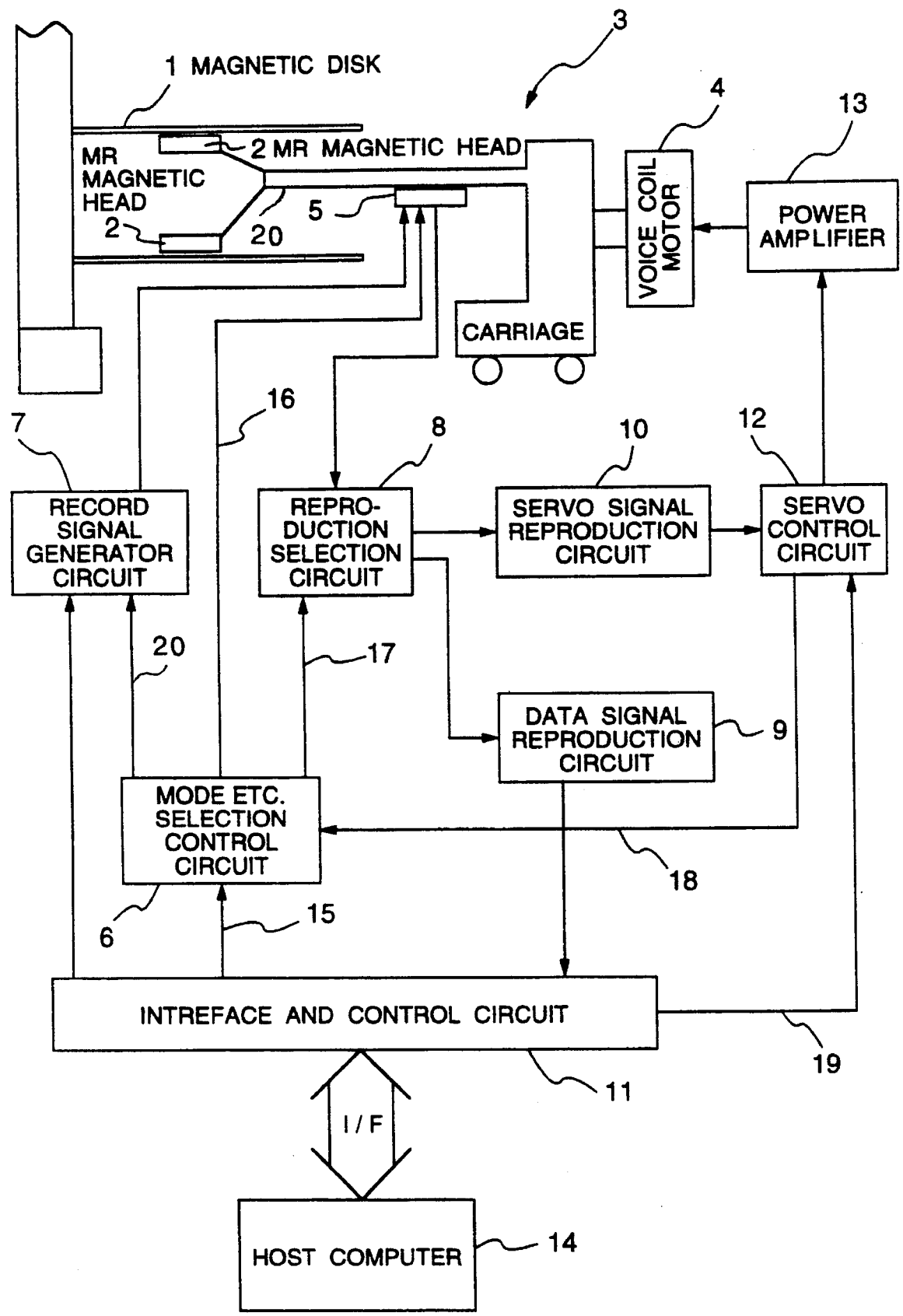
FIG. 1 is a diagram showing the main configuration of a magnetic disk apparatus according to a first embodiment of the present invention.

FIG. 1 shows the main configuration of a magnetic disk apparatus according to a first embodiment of the present invention. This main configuration includes one or a plurality of magnetic disks 1, MR magnetic heads 2 corresponding to the number of the magnetic disks (the MR magnetic heads constitute a read-only combined head using magnetoresistive effect elements), a carriage 3, a voice coil motor 4, a recording/reproduction amplifier 5 having a function to send a sense current into the MR magnetic head, a mode, etc. selection circuit 6 for controlling the mode selection, recording or reproduction selection, and magnetic head selection, a recording signal generator circuit 7, a reproduction selection circuit 8, a data signal reproduction circuit 9, a servo signal reproduction circuit 10, an interface and control circuit 11, a servo control circuit 12, and a power amplifier 13.

In FIG. 1, the carriage 3 and the voice coil motor 4 are shown as linear actuators, but the present invention can be similarly applied in the apparatuses including rotary actuators, which are widely used in small-size disk apparatuses.

Commonly both in recording and reproduction, the interface and control circuit 11, on receiving an order from the host computer 14, sends a recording/reproduction control order 15 to the mode. etc. selection control circuit 6. Also, the interface and control circuit 11 sends a servo control order to the servo control circuit 12. The mode, etc. selection control circuit 6 decides whether a recording action or a reproducing action is done from a recording/reproduction control order 15, and sends a head selection signal 20, a signal 16 to control the recording/reproduction amplifier 5, and a signal 17 to control the reproduction selection circuit 8.

When information is recorded, the recording signal generator circuit 7 receives data to be recorded sent from the host computer via the interface and control circuit 11, and converts the data into a record signal so that the signal can be recorded on a target track on the magnetic disk 1.

When information is reproduced, the recording/reproduction amplifier 5 reads the target data on the magnetic disk 1 through the MR magnetic head 2 by the magnetic head selection signal and the signal 16 to control the recording/reproduction amplifier 5. The reproduction selection circuit 8 cuts the signal from the recording/reproduction amplifier 5 into a servo signal and a data-modulated signal by using the signal to control the circuit 8. The data signal reproduction circuit 9 demodulates a data signal from the data-modulated signal selected by the reproduction selection circuit 8, and sends the data signal through the interface and control circuit 11 to the host computer. The servo signal reproduction circuit 10 generates a position signal for servo control from the servo signal selected by the reproduction selection circuit 8. The servo control circuit 12 generates a signal for a seek or following action to the target track from the position signal generated by the servo signal reproduction circuit 10, and thereby the MR magnetic heads are positioned accurately on the target track by the signal sent through the power amplifier 13, voice coil motor 4, and carriage 3.

Next, the operation when the host computer is not connected (other than a recording or reproduction action) is described.

The interface and control circuit 11 adds information that the host computer is not connected, onto a servo control order 19 sent to the servo control circuit 12. Whereupon, the servo control circuit 12 memorizes the current position to stop servo control, and sends a signal 18 to stop servo control to the mode, etc. selection control circuit 6. The mode, etc. selection control circuit 6 sends a signal to the recording/reproduction amplifier 5 to direct it to stop the supply of a sense current to the magnetoresistive effect element (MR element) to stop the operation of the MR magnetic head 2. As a result of the servo control being stopped, the carriage 3 enters a free state of not being under positioning control.

Subsequently, when the interface and control circuit 11 receives a connect order from the host computer, the circuit 11 adds a signal indicating that the host computer is connected, onto the servo control signal sent to the servo control circuit 12. The servo control circuit 12 sends a signal 18 to resume servo control to the mode etc., selection control circuit 6 to resume servo control. In order to resume the operation of the MR magnetic head 2, the mode etc., selection circuit 6 sends a signal to the recording/reproduction amplifier 5 directing it to supply a sense current to the magnetoresistive effect elements and read a servo signal. The servo control circuit 12 positions the carriage again at the memorized position, and processes an order from the host computer.

By the arrangement mentioned above, it has become possible to shorten the conducting time of a sense current supplied to the magnetoresistive effect elements on the basis of estimation made by taking into account the function of the whole magnetic disk apparatus.

b) Second Embodiment

Figure 2:
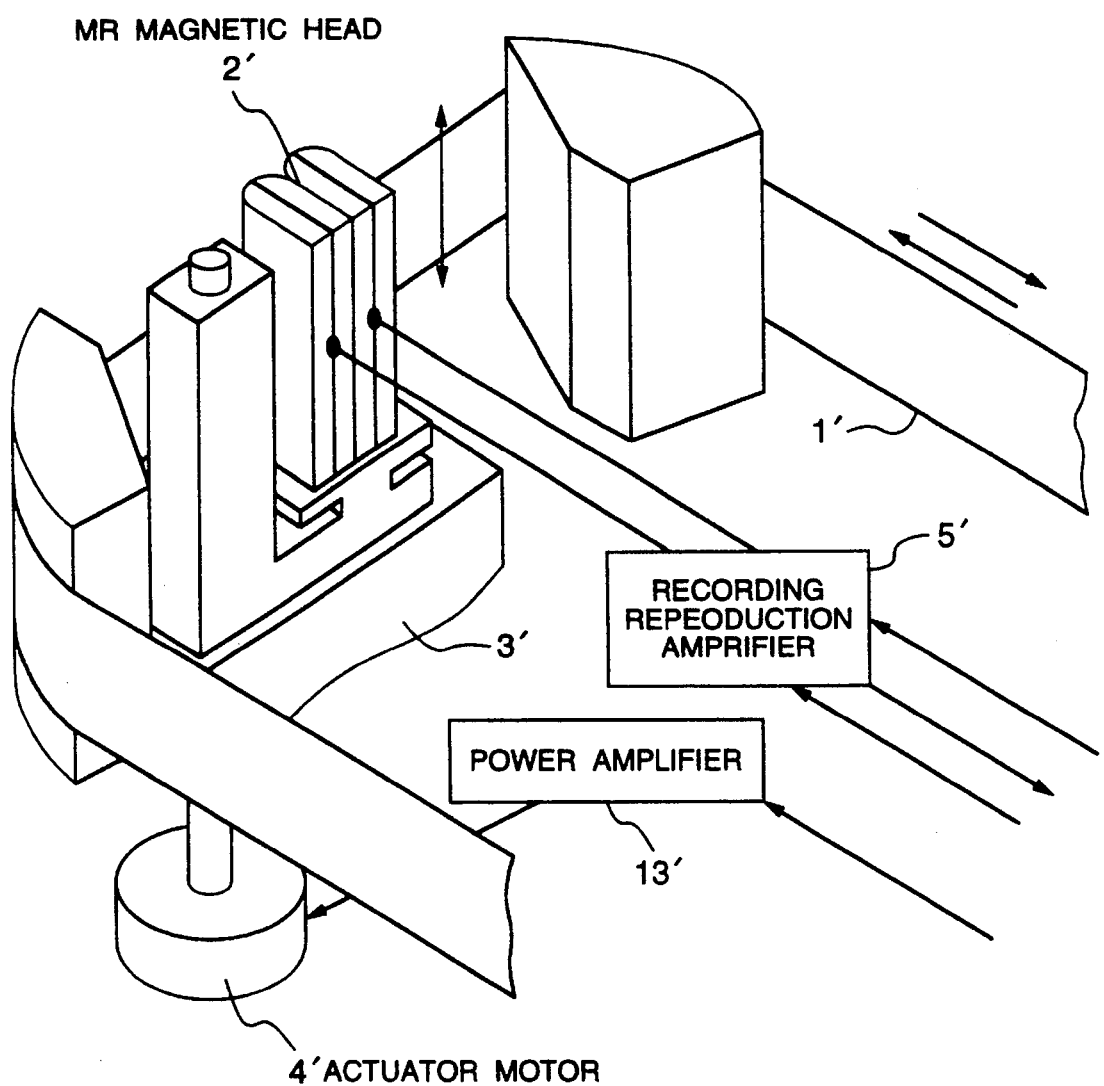
FIG. 2 is a diagram showing the main configuration of a magnetic tape apparatus according to a second embodiment of the present invention.

FIG. 2 shows a main of the magnetic tape apparatus in the second embodiment.

A magnetic tape 1' runs along a guide provided in a magnetic head assembly, not shown, and faces an MR magnetic head 2' with a little space provided between the magnetic tape and the magnetic head. The MR magnetic head 2' is mounted on a carriage 3', and connected through a recording/reproduction amplifier 5' to an electronic circuit system.

The carriage 3' can move in a direction at right angles with the advancing direction of the magnetic tape by driving an actuator motor 4'. The actuator motor 4' converts electric power into mechanical force to drive the carriage 3' by an electric signal sent to a power amplifier 13'.

In the second embodiment, to record or reproduce information on the magnetic tape 1', it is necessary to make a specified range of the tape face the MR magnetic head 2'. To increase the recording density, for example, a plurality of magnetic gaps are provided in the magnetic head, so that while moving (seek action) at right angles relative to the running direction of the magnetic tape, the MR magnetic head 2' can access the plurality of magnetic tracks on the magnetic tape.

This MR magnetic head 2' performs a tracing action (following action) on the plurality of magnetic tracks until it faces the specified range of the tape. The following action may be omitted according to the relation between the track density of the magnetic tape and the required specifications for the magnetic tape apparatus, in other words, if the positioning accuracy is rough but this is tolerated.

Since the control method is the same as in description of the first embodiment of a), its description will be omitted here.

c) Servo Control Method

Figure 3:
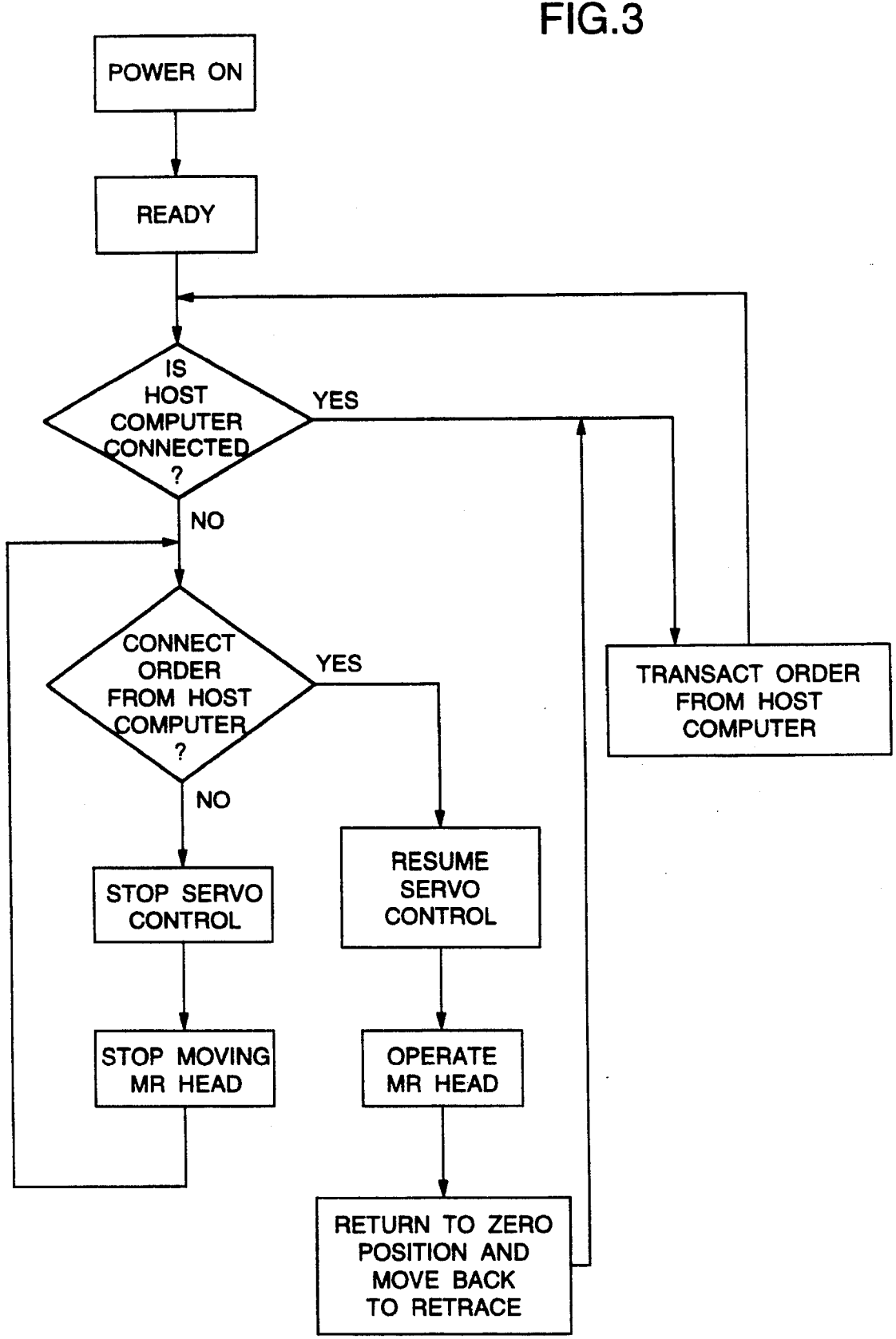
FIG. 3 is a flowchart of a servo control method in the embodiments of the present invention.

With reference to the flowchart in FIG. 3, description will now be made of methods of operating, stopping and resuming servo control according to the present invention.

After electric power is supplied to the magnetic disk apparatus or the magnetic tape apparatus, the disk or tape apparatus according to the embodiments positions the MR magnetic heads at cylinder 0 or track 0 to put the apparatus itself in the READY state. If a transact order is not issued by the host computer for a specified period of time, the magnetic heads need not necessarily be positioned continuously at cylinder 0 or track 0 and, therefore, a decision is made whether or not the host computer is connected and an order is being executed. Or, if the host computer is not connected and a connect order is not issued by the host computer, then servo control is stopped and the supply of a sense current is stopped to prevent the MR magnetic heads 2 from operating. Under this condition, the apparatus waits for a connect order from the host computer.

When the apparatus receives a connect order from the host computer, servo control is resumed, a sense current is supplied to the MR magnetic heads to put them into operation, an RTZ action (Return to Zero) is executed, the MR magnetic heads are positioned at cylinder 0 or track 0 and a transact order from the host computer is executed. In the magnetic tape apparatus, the RTZ action may be omitted. In the description with reference to FIG. 3, the positioning at cylinder 0 or track 0 has been described as an example, but an RTZ action can be performed similarly at any location of the magnetic disk 1 or the magnetic tape 1'.

A second control method is as follows. In the magnetic disk apparatus configured as shown in FIG. 1 or the magnetic tape apparatus shown in FIG. 2, positioning control of the head is performed by sampling a servo signal at specified sampling periods, and when the disk or tape apparatus is in a waiting state that there is no data access command issued from the host computer, the sampling period is extended to be at least more than twice the specified sampling period up to infinity so that the time of supplying a sense current to the magnetoresistive effect element is reduced to less than half.

Figure 4:
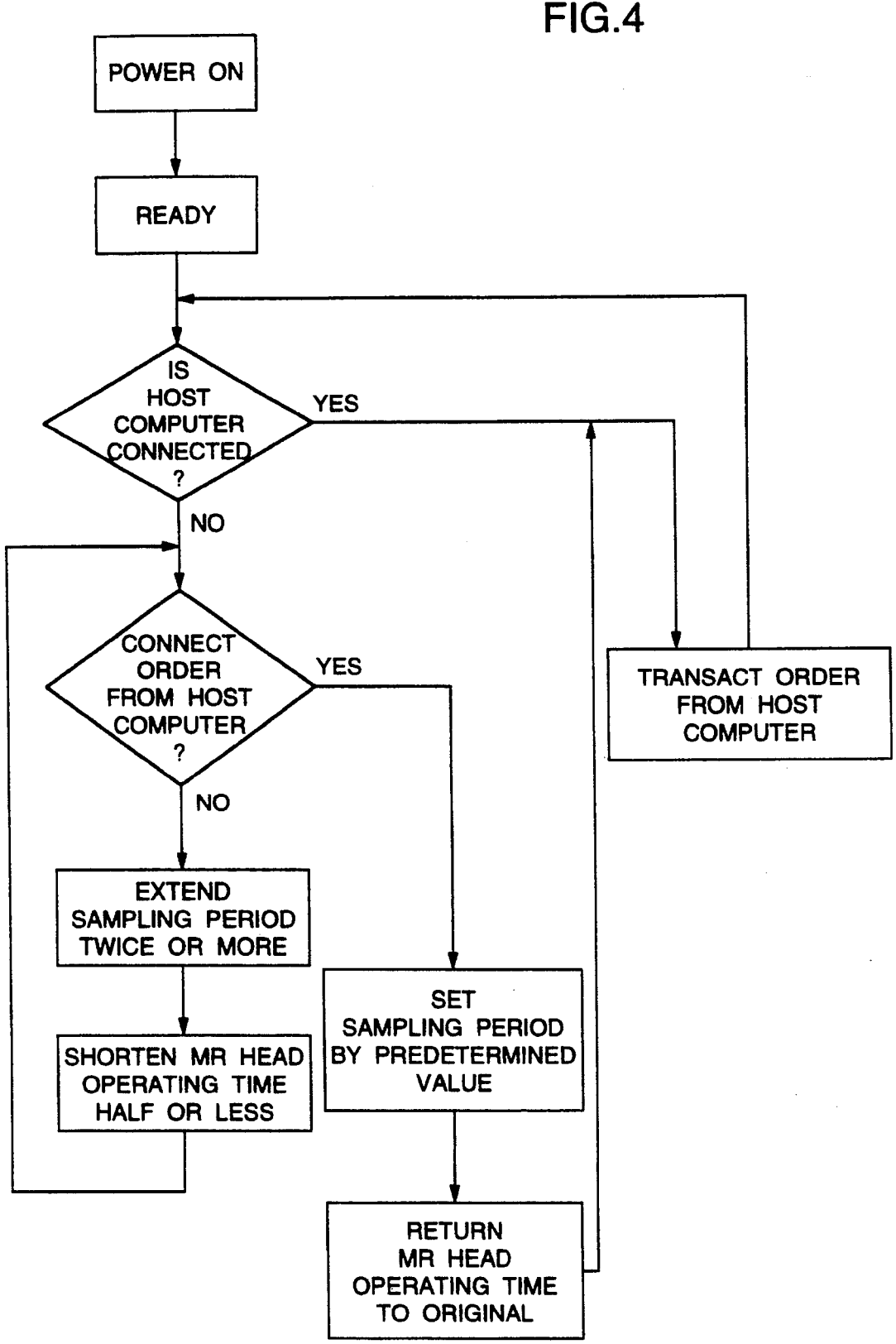
FIG. 4 is a flowchart of a second servo control method in the embodiments of the present invention.

Referring to the flowchart in FIG. 4, description will be made of the method of switching the sampling period mentioned above.

After electric power is supplied to the magnetic disk apparatus or the magnetic tape apparatus, the disk or tape apparatus which applied this control method positions the MR magnetic head 2 at cylinder 0 or track 0 in order to put the apparatus itself in the READY state. In the magnetic tape apparatus, the RTZ action may be omitted.

When a transact order is not issued by the host computer for a specified period of time, the head need not necessarily be positioned continuously and with high accuracy at cylinder 0 or track 0 and, therefore, the sampling period is at least doubled to thereby reduce the time of supplying a sense current to the magnetoresistive effect element to less than half down to zero. Under this condition, the magnetic disk or tape apparatus waits for a connect order from the host computer. On receiving a connect order from the host computer, the magnetic disk or tape apparatus brings the sampling period back to the specified value, sets back the time of supplying a sense current to the magnetoresistive effect element to the normal length, and positions the head to cylinder 0 or track 0 with high accuracy. In the above description, a case where the head is positioned at cylinder 0 or track 0 has been shown, but the head can be positioned at any location on the magnetic disk 1 or the magnetic tape 1'.

A third control method is as follows. In the magnetic disk apparatus configured as shown in FIG. 1, servo control is not performed when an idle seek is taking place, and the supply of a sense current is stopped to prevent the MR magnetic head 2 from operating.

Normally, to prevent the MR magnetic head from performing a following action on a specific cylinder for a long period of time while the disk apparatus is in the READY state, if no transact order is given by the host computer for more than a fixed time, the magnetic head performs an idle seek action. In other words, the magnetic disk apparatus performs a fixed seek action by itself. At this time, the feedback circuit of the servo control system is cut off, and the servo control circuit 12 supplies a small value to the power amplifier 13 to make the voice coil motor 4 rotate slowly.

Figure 5:
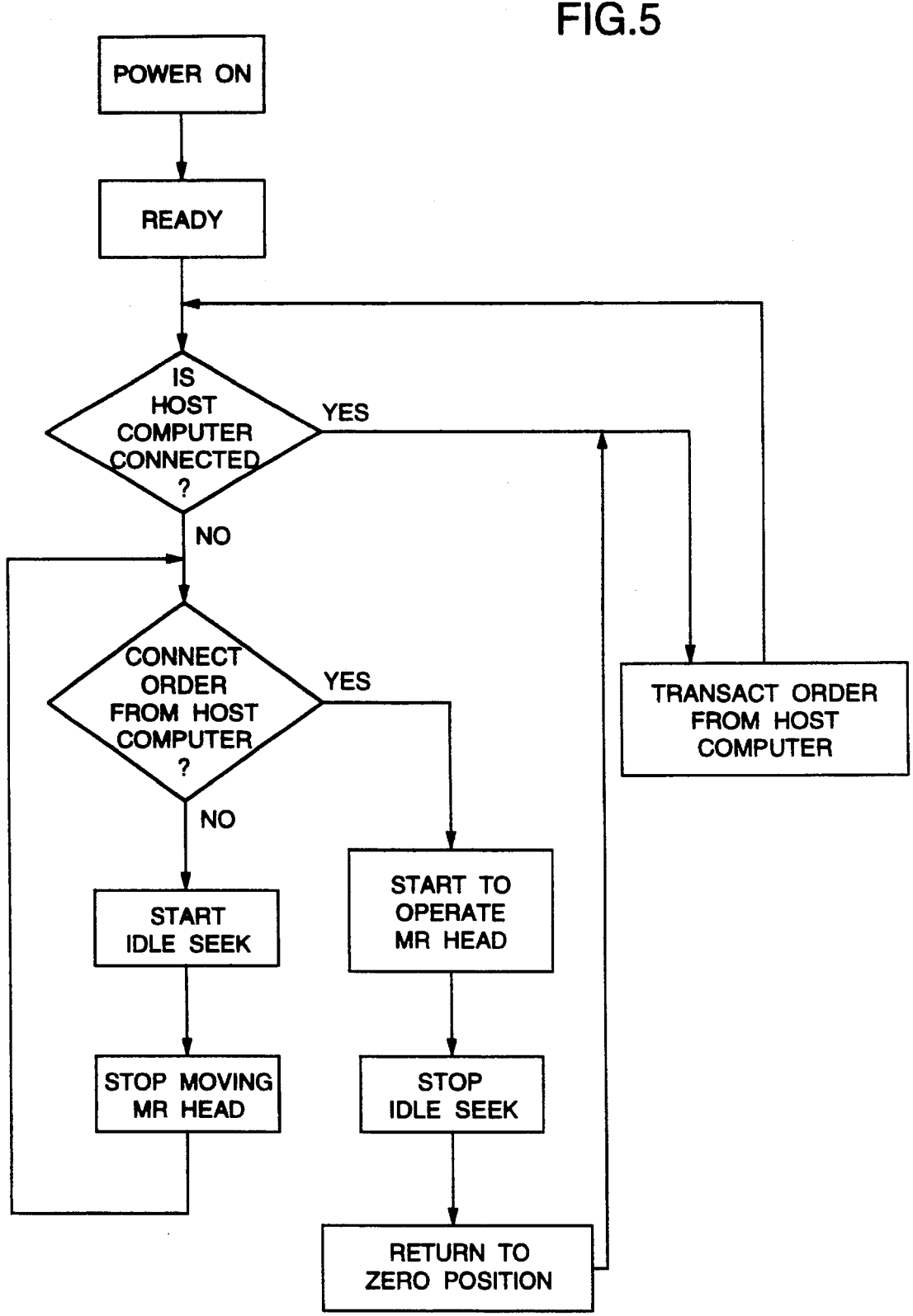
FIG. 5 is a flowchart of a third servo control method in the embodiments of the present invention.

Referring to the flowchart in FIG. 5, description will be made of methods of stopping and resuming the servo control operation during the above-mentioned idle seek action. The magnetic disk apparatus in this embodiment positions the MR magnetic head 2 at cylinder 0 or an optional cylinder, and waits for a transact order while performing a following action. If a transact order is not given by the host computer for a fixed period of time, the magnetic head performs an idle seek to improve the problem of abrasion. The idle seek action is performed by releasing the feedback control, stopping the supply of a sense current to the magnetoresistive element, and applying a fixed voltage to the voice coil motor at regular intervals. It is also possible to control the velocity by detecting the current flowing in the voice coil motor and estimating the actual velocity of motion of the voice coil motor.

If the applied voltage is designated by Vc and the back electromotive force constant of the coil is designated by Kb, the generated maximum velocity is expressed as $$V=Vc/Kb$$

This idle seek action is performed by a kind of control of velocity determined by the applied voltage Vc. This control method makes it possible to keep the MR magnetic head inoperable and stop the supply of a sense current to the magnetoresistive effect element while an idle seek is going on. Under this condition, the magnetic disk apparatus waits for a connect order from the host computer. On receiving a connect order from the host computer, the magnetic disk apparatus resumes servo control, supplies a sense current to the magnetoresistive effect element, performs an RTZ action, positions the head at cylinder 0, and executes a transact order from the host computer. In the description made referring to FIG. 5, a case where the head is positioned at cylinder 0 has been described, but the head can perform an idle seek action at any location on the magnetic disk 1. When a data surface servo control system is used, the head can immediately start a seek action by reading information about track numbers and so on.

By the arrangements mentioned above, it has become possible to reduce the conducting time of a sense current supplied to the magnetoresistive effect elements on the basis of estimation made by taking into account the function of the whole magnetic disk apparatus.

The effects of the present invention are as follows.

By the present invention, the conducting time of a sense current supplied to the magnetoresistive effect elements of the MR magnetic heads is shortened greatly and, therefore, it is possible to prevent the deterioration of the element characteristics due to electromigration and so on, and the life of the MR magnetic heads can be prolonged. According to the present invention, there is provided an effect of increasing the output of the MR magnetic heads without sacrificing the reliability, so that it is possible to lengthen the life of the high-output magnetic recording and reproducing apparatus using the magnetoresistive effect elements.

Having described preferred embodiments of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A method for controlling a magnetic recording and reproducing apparatus having mounted thereon a magnetic head using a magnetoresistive effect element and accessing data on a magnetic disk with a data access command, said method comprising the steps of:

detecting whether a data access command has been received in an interface circuit for a feedback control system; and stopping positioning of said magnetic head and stopping a supply of a sense current to the magnetoresistive effect element to impede deterioration and degradation of the magnetoresistive effect element when the step of detecting detects that there is no access command issued from a host computer.

2. The method of claim 1, further comprising the steps of: sampling servo information at specified sampling periods for positioning the magnetic head when a data access command has been received, and extending wherein the sampling period to at least twice said specified sampling period when there is no data access command detected.

3. The method of claim 2, further comprising the steps of:

idle seeking the magnetic head when the step of detecting detects no access command; and controlling velocity of said idle seeking magnetic head by applying a fixed voltage to said voice coil motor at regular intervals.

4. The method of claim 2, further comprising the steps of:

idle seeking the magnetic head when the step of detecting detects no access command; and controlling velocity of said idle seeking magnetic head by detecting a current flowing in voice coil motor that moves the magnetic head and estimating an actual velocity of the motion of said voice coil motor.

5. A magnetic recording and reproducing apparatus comprising:

a magnetic head including a magnetoresistive effect element;

a magnetic medium facing said magnetic head and supported in a relative motion relationship with said magnetic head;

a feedback control system including:

a recording/reproduction amplifier that amplifies an electric signal transmitted to and from said magnetic head;

a reproduction selection circuit that selects a signal located at a position of said magnetic medium corresponding to said magnetic head and sent from said magnetic head;

a servo signal reproduction circuit coupled to said reproduction selection circuit and providing a signal to control a position of said magnetic head based on an output of said reproduction selection circuit;

a servo control circuit coupled to said servo signal reproduction circuit and responsive to said signal from said servo signal reproduction circuit; and a power amplifier that receives a signal from said servo control circuit;

a motor that receives a signal from said power amplifier;

a carriage coupled to said motor whose motion is governed by said power amplifier and supporting said magnetic head; and an interface and control circuit coupled to a host computer so as to receive an access command when the host computer wants a data access and coupled to said feedback control system to stop a supply of current to said magnetoresistive effect element to impede deterioration and degradation of said magnetoresistive effect element.

6. A magnetic recording and reproducing apparatus according to claim 5, wherein said sampling period in said feedback control system is extended to be at least twice as long as when the interface and control circuit receives an access command.

7. The magnetic recording and reproducing apparatus according to claim 5, wherein said servo control circuit supplies said power amplifier with a signal to cause a fixed voltage to be applied to said motor at regular intervals to perform a seek action of the magnetic head when there is no access command.

8. The magnetic recording and reproducing apparatus according to claim 5, wherein said servo control circuit detects a current flowing in said motor, estimates an actual velocity of motion of said motor, and supplies said power amplifier with a signal to control a moving velocity of said magnetic head when there is no access command.

\* \* \* \* \*

UNITED STATES PATENT AND TRADEMARK OFFICE
CERTIFICATE OF CORRECTION

PATENT NO. : 5,606,470
DATED : February 25, 1997
INVENTOR(S) : Akio Shioya, et. al.

It is certified that error appears in the above-indentified patent and that said Letters Patent is hereby corrected as shown below:

| Column | Line | |
|---|---|---|
| 1 | 58 | Change "performs" to --perform--. |
| 5 | 19 | After "main" insert --configuration--. |
| 8 | 18 | After "extending" delete "wherein". |
| 8 | 32 | After "flowing in" insert --a--. |

Signed and Sealed this

Third Day of June, 1997

Attest:

BRUCE LEHMAN

Attesting Officer

Commissioner of Patents and Trademarks